United States Patent
Carroll et al.

(10) Patent No.: US 9,670,900 B2
(45) Date of Patent: Jun. 6, 2017

(54) ROTOR BLADE ASSEMBLY FOR WIND TURBINE HAVING LOAD REDUCTION FEATURES

(71) Applicant: General Electric Company, Schenectady, NY (US)

(72) Inventors: Christian A. Carroll, Simpsonville, SC (US); Stefan Herr, Greenville, SC (US)

(73) Assignee: General Electric Company, Schenectady, NY (US)

( * ) Notice: Subject to any disclaimer, the term of this patent is extended or adjusted under 35 U.S.C. 154(b) by 817 days.

(21) Appl. No.: 13/852,241

(22) Filed: Mar. 28, 2013

(65) Prior Publication Data

US 2014/0294595 A1 Oct. 2, 2014

(51) Int. Cl.
 *F03D 11/02* (2006.01)
 *F03D 1/06* (2006.01)
(52) U.S. Cl.
 CPC ......... *F03D 1/0633* (2013.01); *F03D 1/0641* (2013.01); *Y02E 10/721* (2013.01)
(58) Field of Classification Search
 CPC .... F03D 1/0633; F03D 1/0641; F03D 1/0683; F03D 7/022; Y02E 10/721; Y02E 10/723; F05B 2240/31; F05B 2240/301; F05B 2260/962
 USPC ......... 416/242, 236, 228, 243, 1, 23, 236 R, 416/235, 237; 415/4.3, 4.5
 See application file for complete search history.

(56) References Cited

U.S. PATENT DOCUMENTS

| | | | |
|---|---|---|---|
| 4,641,796 A | 2/1987 | Feifel | |
| 8,061,986 B2 | 11/2011 | Xiong | |
| 8,157,533 B2 | 4/2012 | Godsk et al. | |
| 8,251,657 B2 | 8/2012 | Obrecht et al. | |
| 8,668,461 B2 | 3/2014 | Fischer | |
| 8,668,462 B2 | 3/2014 | Fischer et al. | |
| 2011/0064582 A1* | 3/2011 | Romero Sanz | F03D 1/06 416/223 R |

(Continued)

FOREIGN PATENT DOCUMENTS

| | | | |
|---|---|---|---|
| DK | GB 129972 A | * 11/1919 | ........... F03D 1/0641 |
| EP | 2292926 A1 | 3/2011 | |
| GB | 129972 A | 11/1919 | |

OTHER PUBLICATIONS

EP Search Report issued in connection with corresponding EP Patent Application No. 14160642.6 dated on Aug. 19, 2014.

(Continued)

*Primary Examiner* — Phutthiwat Wongwian
*Assistant Examiner* — Kelsey Stanek
(74) *Attorney, Agent, or Firm* — Dority & Manning, P.A.

(57) ABSTRACT

Rotor blade assemblies for wind turbines are provided. In one embodiment, a rotor blade assembly includes a rotor blade having exterior surfaces defining a pressure side, a suction side, a leading edge, and a trailing edge each extending between a tip and a root. The rotor blade further defines a span and a chord. A span-wise portion of the pressure side includes along a chord-wise cross-section a plurality of inflection points. The plurality of inflection points include a first inflection point and a second inflection point, the first and second inflections points positioned within approximately 50% of the chord from the leading edge.

14 Claims, 4 Drawing Sheets

(56) References Cited

U.S. PATENT DOCUMENTS

2012/0063896 A1* 3/2012 Obrecht ............... F03D 1/0641
          416/31
2013/0115098 A1  5/2013 Madsen et al.

OTHER PUBLICATIONS

U.S. Appl. No. 13/644,130 entitled "Noise Reduction Tab and Method for Wind Turbine Rotor Blade", filed Oct. 3, 2012.

\* cited by examiner

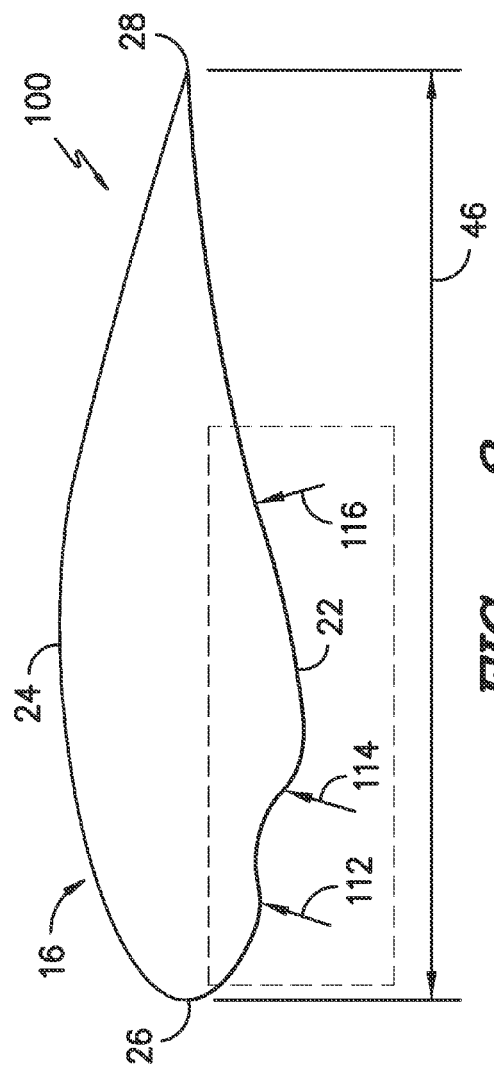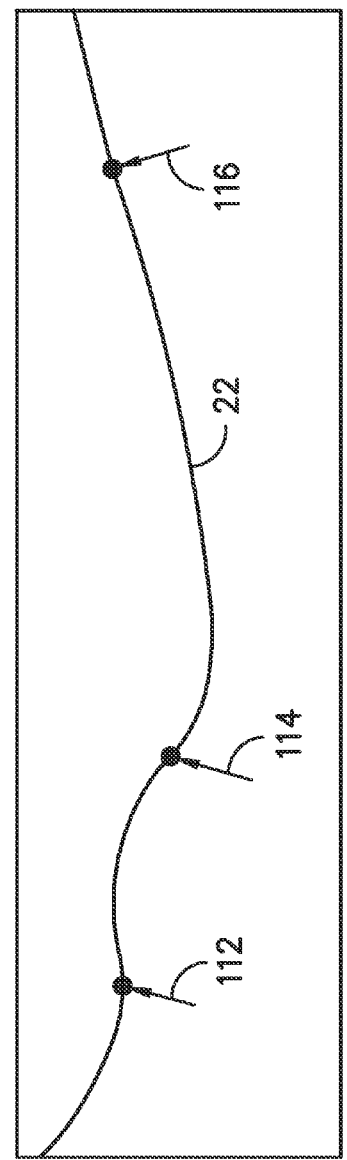

ROTOR BLADE ASSEMBLY FOR WIND TURBINE HAVING LOAD REDUCTION FEATURES

FIELD OF THE INVENTION

The present disclosure relates in general to wind turbines, and more specifically to rotor blade assemblies therefore which include load reduction features.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The loading capabilities of rotor blades and wind turbines in general is of concern during wind turbine design and operation, especially as wind turbine and corresponding rotor blade sizes are increased. High system loads generally lead to increased component size, weight, and cost, which affect the efficiency, performance, and profitability of the wind turbine.

Attempts have been made to reduce rotor blade loading. However, a competing concern when attempting to reduce rotor blade loading is the aerodynamic performance of the rotor blades. In many cases, critical design load capabilities for rotor blades are driven by the loads that are generated when the rotor blades are operating off-design, such as near or within stall regions. A stall region is generally a region wherein changes in the lift coefficient based on changes in the angle of attack of a rotor blade are relatively strong. In a graphical representation of lift coefficient versus angle of attack, for example, stall regions are regions wherein there are strong slopes and changes in slopes. It would thus be desirable to reduce off-design loading while minimizing or eliminating any effects to on-design performance of the rotor blades.

Accordingly, improved wind turbine rotor blades are desired in the art. In particular, rotor blades with off-design load reduction capabilities that have minimal or no on-design performance effects would be advantageous. Additionally, such rotor blade designs in both new construction and retrofit scenarios are desired.

BRIEF DESCRIPTION OF THE INVENTION

Aspects and advantages of the invention will be set forth in part in the following description, or may be obvious from the description, or may be learned through practice of the invention.

In one embodiment, a rotor blade assembly for a wind turbine is disclosed. The rotor blade assembly includes a rotor blade having exterior surfaces defining a pressure side, a suction side, a leading edge, and a trailing edge each extending between a tip and a root. The rotor blade further defines a span and a chord. A span-wise portion of the pressure side includes along a chord-wise cross-section a plurality of inflection points. The plurality of inflection points include a first inflection point and a second inflection point, the first and second inflections points positioned within approximately 50% of the chord from the leading edge.

In another embodiment, a rotor blade assembly for a wind turbine is disclosed. The rotor blade assembly includes a rotor blade having exterior surfaces defining a pressure side, a suction side, a leading edge, and a trailing edge each extending between a tip and a root. The rotor blade further defines a span and a chord. The rotor blade assembly further includes a tab mounted to a span-wise portion of the pressure side of the rotor blade. An outer surface of the tab has a curvature that modifies along a chord-wise cross-section an exterior surface of the rotor blade within approximately 50% of the chord from the leading edge.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 3 is a cross-sectional view of a portion of a rotor blade assembly according to one embodiment of the present disclosure;

FIG. 4 is a close-up view of a portion of the rotor blade assembly of FIG. 3;

DETAILED DESCRIPTION OF THE INVENTION

Figure 1:
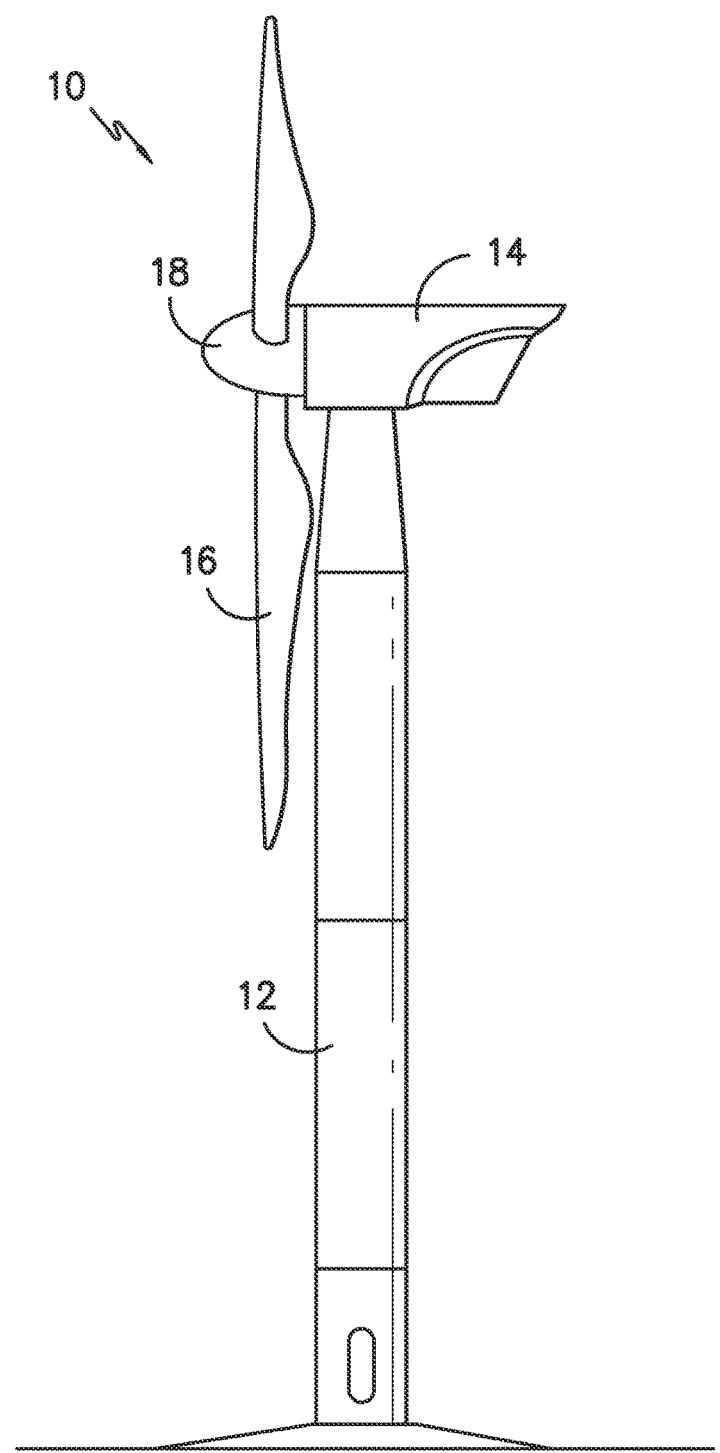
FIG. 1 is a side view of a wind turbine according to one embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Figure 2:
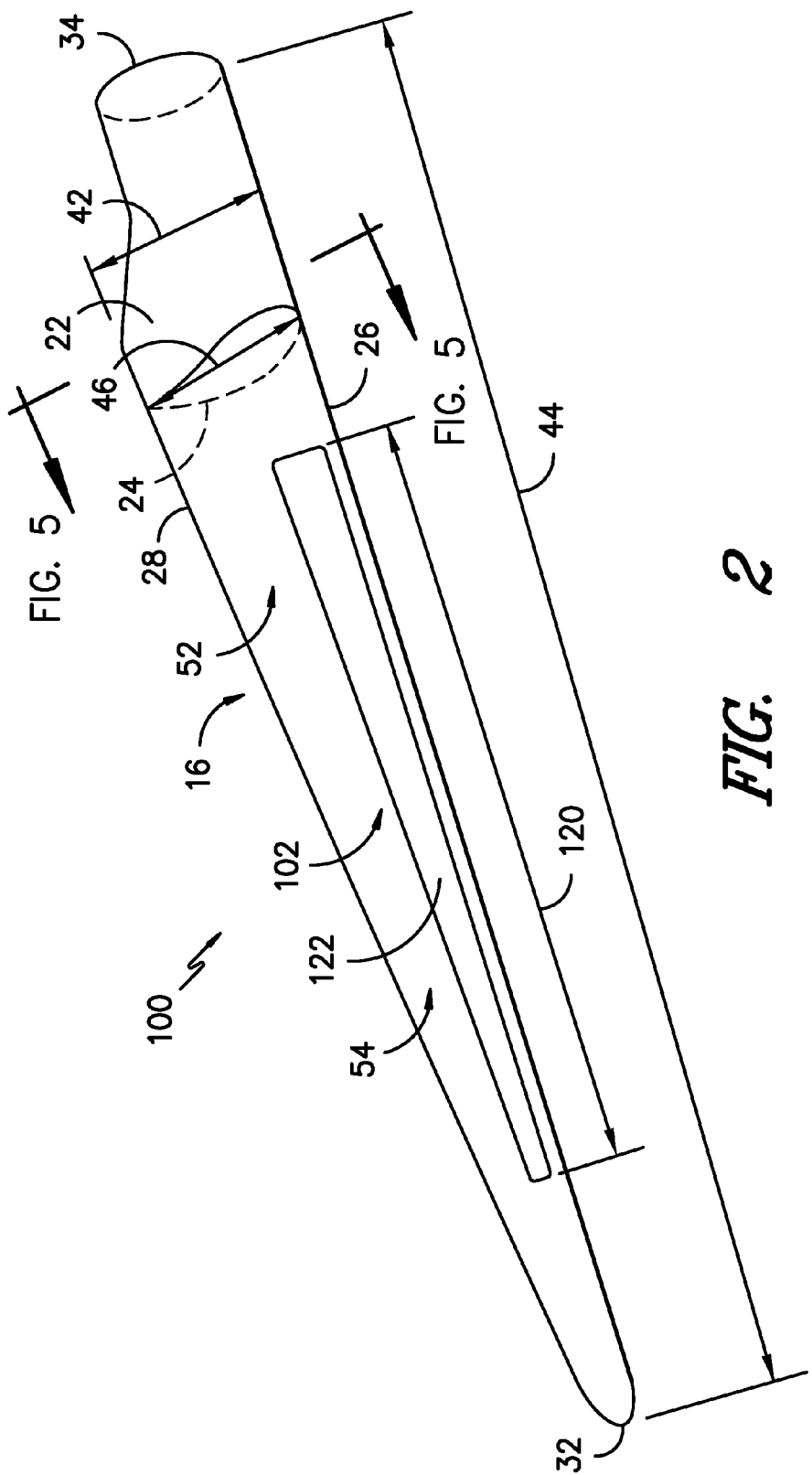
FIG. 2 is a bottom view of a rotor blade assembly according to one embodiment of the present disclosure.

Referring now to FIG. 2, a rotor blade 16 according to the present disclosure may include exterior surfaces defining a pressure side 22 and a suction side 24 extending between a leading edge 26 and a trailing edge 28, and may extend from a blade tip 32 to a blade root 34. The exterior surfaces may be generally aerodynamic surfaces having generally aerodynamic contours, as is generally known in the art.

In some embodiments, the rotor blade 16 may include a plurality of individual blade segments aligned in an end-to-end order from the blade tip 32 to the blade root 34. Each of the individual blade segments may be uniquely configured so that the plurality of blade segments define a complete rotor blade 16 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 16. Alternatively, the rotor blade 16 may be formed as a singular, unitary blade having the designed aerodynamic profile, length, and other desired characteristics.

The rotor blade 16 may, in exemplary embodiments, be curved. Curving of the rotor blade 16 may entail bending the rotor blade 16 in a generally flapwise direction and/or in a generally edgewise direction. The flapwise direction may generally be construed as the direction (or the opposite direction) in which the aerodynamic lift acts on the rotor blade 16. The edgewise direction is generally perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

The rotor blade 16 may further define chord 42 and a span 44. As shown in FIGS. 2 and 3, the chord 42 may vary throughout the span 44 of the rotor blade 16. Thus, a local chord 46 may be defined for the rotor blade 16 at any point on the rotor blade 16 along the span 44.

Additionally, the rotor blade 16 may define an inboard area 52 and an outboard area 54. The inboard area 52 may be a span-wise portion of the rotor blade 16 extending from the root 34. For example, the inboard area 52 may, in some embodiments, include approximately 25%, 33%, 40%, 50%, 60%, 67%, 75% or any percentage or range of percentages therebetween, or any other suitable percentage or range of percentages, of the span 44 from the root 34. The outboard area 54 may be a span-wise portion of the rotor blade 16 extending from the tip 32, and may in some embodiments include the remaining portion of the rotor blade 16 between the inboard area 52 and the tip 32. Additionally or alternatively, the outboard area 54 may, in some embodiments, include approximately 25% 33%, 40%, 50%, 60%, 67%, 75% or any percentage or range of percentages therebetween, or any other suitable percentage or range of percentages, of the span 44 from the tip 32.

As illustrated in FIGS. 2 through 6, the present disclosure may further be directed to one or more rotor blade assemblies 100. A rotor blade assembly according to the present disclosure generally includes one or more load reduction features. Such load reduction features advantageously reduce loading on the rotor blade assembly 100 during off-design operation, such as near or within stall regions. Such load reduction features further advantageously cause minimal or no modification to the on-design operation of the rotor blade assembly 100. To facilitate such off-design load reduction, the load reduction features according to the present disclosure operate to reduce the lift and increase the drag or increase the lift and reduce the drag of the rotor blade assembly 100 during operation, in particular off-design operation. Further, in exemplary embodiments, these load reduction features are designed such that lift and drag are maintained, rather than increased or decreased as discussed, during on-design operation. By modifying the lift and drag during off-design loading, load reduction features according to the present disclosure may significantly reduce off-design loading, such as in some embodiments by up to 40% (or more).

FIGS. 2 through 6 illustrate embodiments of a rotor blade assembly 100 according to the present disclosure. As shown, the rotor blade assembly 100 includes the rotor blade 16, which has exterior surfaces defining a pressure side 22, suction side 24, leading edge 26, and trailing edge 28. As further discussed, the rotor blade 16 defines a span 44 and a chord 42. In exemplary embodiments according to the present disclosure, a span-wise portion 102 of the pressure side 22 of the rotor blade 16 has, along a chord-wise cross-section as shown in FIGS. 3 through 6, a modified curvature. For example, as shown a span-wise portion 102 of the pressure side 22 of the rotor blade 16 may include, along a chord-wise cross-section as shown in FIGS. 3 through 6, a plurality of inflection points. In exemplary embodiments, every chord-wise cross-section of the span-wise portion 102 includes a plurality of inflection points. An inflection point, as is generally understood, is a location along a curve at which the curvature changes signs, from positive curvature to negative curvature or vice-versa. Thus, in accordance with the present disclosure, at any chord-wise cross-section within the span-wise portion 102, the curvature of the pressure side 22 changes signs multiple times. Such evaluation of the curvature of the pressure side 22 may be made with reference to an axis along the chord 42 and an axis perpendicular to the chord 42 and span 44.

Figure 5:
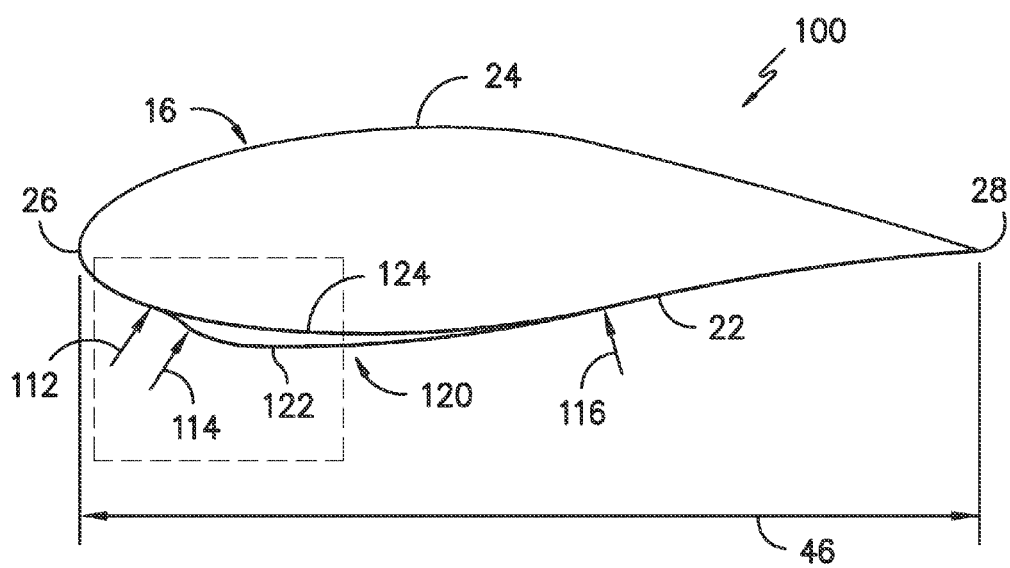
FIG. 5 is a cross-sectional view of a portion of a rotor blade assembly according to another embodiment of the present disclosure.
Figure 6:
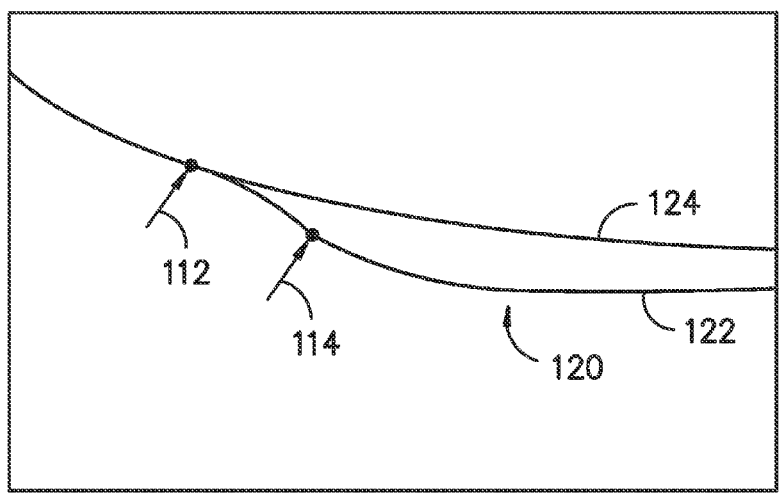
FIG. 6 is a close-up view of a portion of the rotor blade assembly of FIG. 5.

In particular, as shown in FIGS. 3 through 6, such curvature modification of the pressure side 22 may be made within approximately 50% of the chord from the leading edge 26, such as within approximately 40% of the chord from the leading edge 26. For example, as shown, the plurality of inflection points may include a first inflection point 112 and a second inflection point 114. (It should be noted that the arrows in FIGS. 3 through 6 and the bullet points in FIGS. 4 and 6 are for illustrative purposes only, to indicate the locations of various inflection points). The first and second inflection points 112, 114 may both be positioned within approximately 50% of the chord from the leading edge 26, such as within approximately 40% of the chord from the leading edge 26. During on-design operation of the rotor blade assembly 100, when the angle of attack (the angle between the chord or other reference line on the rotor blade 16 and the wind flow direction) is relatively minimal as compared to off-design operation, such curvature modifications, such as through the addition of two inflection points 112, 114 within approximately 50% or approximately 40% of the chord from the leading edge 26, may cause no or minimal effects on the performance of the rotor blade assembly 100. However, during off-design operation, when the angle of attack is such that the rotor blade assembly 100 is operating outside of an on-design region, such curvature modifications advantageously vary the lift and drag of the rotor blade assembly 100, thus reducing the load on the rotor blade assembly 100.

The span-wise portion 102 of the pressure side 22 can be any suitable portion of the rotor blade 16. For example, in some embodiments, the span-wise portion 102 may be positioned between a span-wise location of the maximum local chord 46 and the tip 32. In other embodiments, the span-wise portion 102 may be positioned between the maximum local chord 46 and approximately 90% of the span (wherein the root 34 is 0% span and the tip 32 is 100% span).

In some embodiments as shown, a rotor blade assembly 100 according to the present disclosure, such as the plurality of inflection points thereof, further includes a third inflection point 116. The third inflection point 116 may be positioned between approximately 50% and approximately 100% of the chord from the leading edge 26.

In some embodiments, as shown in FIGS. 3 and 4, the modified curvature, such as the plurality of inflection points, is provided on the exterior surface of the rotor blade 16 itself. Such modification of the rotor blade 16 may be performed during initial design and construction of the rotor blade 16, or during later modification of the rotor blade 16. In other embodiments, as shown in FIGS. 5 and 6, one or more tabs 120 may be mounted to a rotor blade 16 to provide the modified curvature. In these embodiments, the rotor blade 16 may have a standard aerodynamic curvature, and the tabs 120 may, for example, be retrofitted onto the rotor blade 16 to provide the beneficial off-design load modification.

For example, as shown in FIGS. 5 and 6, in some embodiments, a rotor blade assembly 100 includes a rotor blade 16 and one or more tabs 120 mounted to the rotor blade 16. As shown, an outer surface 122 of each tab 120 modifies an exterior surface of the rotor blade 16, such as the exterior surface defining the pressure side 22, such that the span-wise portion 102 of the pressure side 22 has, along a chord-wise cross-section, a modified curvature. Such modified curvature, as discussed above, may for example, include a plurality of inflection points, as discussed above.

In some embodiments, an inner surface 124 of a tab 120 may have a curvature that corresponds to the curvature of the exterior surface of the rotor blade 16 to which the tab 120 is mounted. Thus, the inner surface 124 may generally be fully in contact with the exterior surface when the tab 120 is mounted thereto.

In exemplary embodiments, tabs 120 according to the present disclosure are passive. Thus, such tabs 120 do not include actuators, drive mechanisms, etc., to move the tabs 120 into operable positions to provide load modifications to the rotor blade assembly 100. Passive tabs 120 provide such load modifications due instead to their size, shape, and location on the rotor blade 16.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly for a wind turbine, the rotor blade assembly comprising:
   a rotor blade having exterior surfaces defining a pressure side, a suction side, a leading edge, and a trailing edge each extending between a tip and a root, the rotor blade further defining a span and a chord,
   wherein a span-wise portion of the pressure side comprises a tab mounted along a chord-wise cross-section, the tab comprising a plurality of inflection points, the plurality of inflection points comprising a first inflection point, a second inflection point, and a third inflection point, the first and second inflections points positioned within 40% of the chord from the leading edge, and the third inflection point positioned between 50% and 100% of the chord from the leading edge, the tab comprising a first end and an opposing, second end that define an overall length therebetween, the first end corresponding to the first inflection point, the second end corresponding to the third inflection point, the second inflection point configured between the first and third inflection points,
   wherein the tab comprises a continuously curved profile along its entire length that tapers towards the pressure side of the rotor blade from the second inflection point to the third inflection point.

2. The rotor blade assembly of claim 1, wherein the span-wise portion is positioned between a span-wise location of a maximum local chord of the rotor blade and the tip of the rotor blade.

3. The rotor blade assembly of claim 1, wherein the span-wise portion is positioned between a span-wise location of a maximum local chord of the rotor blade and 90% of the span.

4. The rotor blade assembly of claim 1, wherein an inner surface of the tab has a curvature that corresponds to a curvature of an exterior surface of the rotor blade.

5. The rotor blade assembly of claim 1, wherein the tab is passive.

6. The rotor blade assembly of claim 1, wherein the tab comprises a plurality of tabs.

7. The rotor blade assembly of claim 1, wherein the tab tapers continuously away from the pressure side of the rotor blade from the first inflection point to the second inflection point and also tapers continuously towards the pressure side of the rotor blade from the second inflection point to the third inflection point.

8. A wind turbine, comprising:
   a tower;
   a nacelle mounted on the tower; and
   a plurality of rotor blades, each of the plurality of rotor blades having exterior surfaces defining a pressure side, a suction side, a leading edge, and a trailing edge each extending between a tip and a root, each of the plurality of rotor blades further defining a span and a chord,
   wherein a span-wise portion of the pressure side of at least one of the plurality of rotor blades comprises a tab mounted along a chord-wise cross-section, the tab comprising a plurality of inflection points, the plurality of inflection points comprising a first inflection point, a second inflection point, and a third inflection point, the first and second inflections points positioned within 40% of the chord from the leading edge, and the third inflection point positioned between 50% and 100% of the chord from the leading edge, the tab comprising first end and an opposing, second end that define an overall length therebetween, the first end corresponding to the first inflection point, the second end corresponding to the third inflection point, the second inflection point configured between the first and third inflection points, wherein the tab comprises a continuously curved profile along its entire length that tapers towards the pressure side of the rotor blade from the second inflection point to the third inflection point.

9. The wind turbine of claim 8, wherein the span-wise portion is positioned between a span-wise location of a maximum local chord of the rotor blade and the tip of the rotor blade.

10. The wind turbine of claim 8, wherein the span-wise portion is positioned between a span-wise location of a maximum local chord of the rotor blade and 90% of the span.

11. The wind turbine of claim 8, wherein an inner surface of the tab has a curvature that corresponds to a curvature of an exterior surface of the rotor blade.

12. The wind turbine of claim 8, wherein the tab is passive.

13. The wind turbine of claim 8, wherein the tab comprises a plurality of tabs.

14. The rotor blade assembly of claim 8, wherein the tab tapers continuously away from the pressure side of the rotor blade from the first inflection point to the second inflection point and also tapers continuously towards the pressure side of the rotor blade from the second inflection point to the third inflection point.

* * * * *